(12) United States Patent
Chen et al.

(10) Patent No.: US 8,867,634 B2
(45) Date of Patent: Oct. 21, 2014

(54) METHOD AND APPRATUS FOR SPECTRUM SENSING FOR OFDM SYSTEMS EMPLOYING PILOT TONES

(75) Inventors: Hou-Shin Chen, East Brunswick, NJ (US); Wen Gao, West Windsor, NJ (US)

(73) Assignee: Thomson Licensing, Issy les Moulineaux (FR)

(*) Notice: Subject to any disclaimer, the term of this patent is extended or adjusted under 35 U.S.C. 154(b) by 368 days.

(21) Appl. No.: 13/138,585

(22) PCT Filed: Mar. 12, 2010

(86) PCT No.: PCT/US2010/000744
§ 371 (c)(1),
(2), (4) Date: Sep. 8, 2011

(87) PCT Pub. No.: WO2010/104591
PCT Pub. Date: Sep. 16, 2010

(65) Prior Publication Data
US 2011/0317750 A1    Dec. 29, 2011

Related U.S. Application Data

(60) Provisional application No. 61/210,008, filed on Mar. 12, 2009.

(51) Int. Cl.
*H04K 1/10*  (2006.01)
*H04L 27/00* (2006.01)
*H04L 5/00*  (2006.01)

(52) U.S. Cl.
CPC .......... *H04L 27/0006* (2013.01); *H04L 5/0007* (2013.01)
USPC ........... 375/260; 375/267; 375/343; 375/341; 375/224

(58) Field of Classification Search
CPC ....... H04B 1/69; H04K 3/226; H04L 27/0008
USPC ........................................... 375/260
See application file for complete search history.

(56) References Cited

U.S. PATENT DOCUMENTS

| 5,343,499 A * | 8/1994 | Jasper et al. | 375/261 |
| 6,421,401 B1 * | 7/2002 | Palin | 375/343 |

(Continued)

FOREIGN PATENT DOCUMENTS

| GB | 2447972 | 10/2008 |
| WO | WO2008096322 | 8/2008 |

OTHER PUBLICATIONS

Hou-Shin Chen etal: "Spectrum Sensing for OFDM Systems Employing Pilot Tones and Application to DVB-T OFDM", IEEE,May 19, 2008,pp. 3421-3426.

(Continued)

*Primary Examiner* — Lihong Yu
(74) *Attorney, Agent, or Firm* — Robert D. Shedd; Ronald J. Kolczynski

(57) ABSTRACT

Methods and apparatuses for OFDM spectrum sensing are provided. The proposed spectrum sensing algorithms are based on Time-Domain Symbol Cross-Correlation (TDSC-MRC and TDSC-NP methods) and can be applied to all existing wireless OFDM systems. The statistical behaviors of the TDSC-based spectrum sensors are explicitly analyzed. In addition, the spectrum sensing method employing the Cyclic Prefix of the OFDM modulated signals (CP method) is described for comparison purposes. The DVB-T Standard is adopted as an application example to illustrate the proposed spectrum sensing algorithms. Simulation results show that the TDSC-MRC method outperforms the CP method for all values of CP ratio considered. The TDSC methods have the advantage that the detection performances are the same for different CP ratios, while the detection performance of the CP method degrades dramatically when the CP ratio becomes small.

4 Claims, 5 Drawing Sheets

(56) References Cited

U.S. PATENT DOCUMENTS

| | | |
|---|---|---|
| 7,058,151 B1 | 6/2006 | Kim |
| 7,149,266 B1 | 12/2006 | Imamura et al. |
| 2003/0016621 A1 | 1/2003 | Li |
| 2008/0137761 A1 | 6/2008 | Stadelmeier et al. |
| 2008/0225689 A1 | 9/2008 | Bickerstaff et al. |
| 2008/0239941 A1 | 10/2008 | Gold-Gavriely et al. |
| 2008/0243482 A1* | 10/2008 | Skubacz et al. .......... 704/9 |
| 2009/0028252 A1 | 1/2009 | Lu |
| 2009/0154529 A1 | 6/2009 | Cho et al. |

OTHER PUBLICATIONS

Hou-Shin Chen etal: "Spectrum sensing for OFDM systems Employing Pilot tones" IEEE, vol. 8, No. 12, Dec. 1, 2009, pp. 5862-5870.

Search Report Dated June 30, 2010.

\* cited by examiner

US 8,867,634 B2

METHOD AND APPRATUS FOR SPECTRUM SENSING FOR OFDM SYSTEMS EMPLOYING PILOT TONES

CROSS-REFERENCE TO RELATED APPLICATIONS

This application claims the benefit, under 35 U.S.C. §365 of International Application PCT/US2010/000744, filed Mar. 12, 2010, which was published in accordance with PCT Article 21(2) on Sep. 16, 2010 in English and which claims the benefit of U.S. provisional patent application No. 61/210,008, filed Mar. 12, 2009.

TECHNICAL FIELD

The present principles relate to spectrum sensing of Orthogonal Frequency Division Multiplexed signals and systems.

BACKGROUND OF THE INVENTION

Recently, the Federal Communications Commission (FCC) has approved that unlicensed radio transmitters can operate in the broadcast television spectrum at locations where that spectrum is not being used by licensed services (this unused TV spectrum is often termed "white spaces") under certain rules. It can be expected that the implementation of Cognitive Radio (CR) in TV white space will be a major topic within wireless communication into the future. Cognitive Radio was introduced to implement negotiated, or opportunistic, spectrum sharing to provide a viable solution to the problem of sparsity of the wireless spectrum. In 2004, based on the expectation of unlicensed use of TV white space, under the charter of an IEEE 802 Standards Committee, a working group named IEEE 802.22 was established to develop a standard for a Cognitive Radio-based PHY/MAC/air interface for use by license-exempt devices on a non-interfering basis in spectrum that has already been allocated to the TV Broadcast Service. The IEEE 802.22 working group is also called the WRAN Group, since it is essentially developing an air interface for a Wireless Regional Area Network (WRAN) with a range as large as 30 miles. To implement CR systems that will not interfere with licensed signals, it is important to be able to detect the presence of licensed signals under very low signal-to-noise ratio (SNR) conditions. To this end, the IEEE 802.22 WRAN Group established a sensing tiger team to be responsible for the development of spectrum sensing methodologies. The TV broadcast signal in North America was under transition from analog to digital and the transition ended on Jun. 12, 2009. The Digital TV (DTV) signal is 8-PAM employing a Vestigial Sideband (VSB) modulated signal specified by the ATSC Digital Television Standard. Therefore, the main task in spectrum sensing for IEEE 802.22 WRAN is to detect the existence of the ATSC-specified signal in the TV bands. Besides the US Office of Communications (Ofcom), independent regulators and the competition authority of the communication industries in the United Kingdom, have considered license exempt use of interleaved TV spectrum for cognitive devices in December 2007. The DTV signal in Europe is an OFDM-based signal defined by the Digital Video Broadcasting-Terrestrial (DVB-T and DVB-T2) Standards. There are also many existing or progressing standards which adopt an OFDM transmission technique. There are existing sensing algorithms in the prior art, including those proposed to the WRAN Group. Most of these sensing methods can only be used for ATSC DTV signals. One prior art method using a power detector does not work when the SNR is below −3.3 dB because of a noise uncertainty issue. Another prior art method using an eigenvalue-based algorithm typically cannot distinguish between interference signals and licensed signals. As a result, a robust spectrum sensing algorithm which is dedicated to OFDM modulated signals is highly desired. Most of the existing OFDM spectrum sensing methods make use of the Cyclic Prefix (CP) or cyclostationarity of OFDM signals. There are different ways of introducing cyclostationarity in OFDM signals, e.g., by the use of Cyclic Prefix (CP), or by the use of different transmit powers on the subcarriers. Among these ways, the cyclostationarity property of the OFDM signals is most significant due to the insertion of CP. The spectrum sensing performance of the cyclostationarity based methods are either similar, or worse than that of the CP method. For both reference and comparison purposes, the OFDM spectrum sensing by the CP method is briefly described in this description. Obviously, the sensing performance of CP-based or cyclostationarity-based spectrum sensing methods depends highly on the length of CP that is inserted. When the CP length is short, a long sensing time is needed to obtain good sensing performance. Motivated by the demand for spectrum sensing in the context of OFDM modulated signals, this description includes the design of a spectrum sensing algorithm based on the Time-Domain Symbol Cross-Correlation (TDSC) of two OFDM symbols. The TDSC algorithm utilizes the property that there is a nonzero constant term embedded in the TDSC if the two OFDM symbols have the same frequency-domain pilot symbols. Thus, the proposed spectrum sensing method can be applied to any OFDM system which allocates frequency-domain pilot symbols to assist in performing synchronization and channel estimation. This description first statistically analyzes the TDSC of two OFDM symbols in which the same frequency-domain pilot symbols are embedded. Based on the TDSC, spectrum sensing algorithms for OFDM systems employing pilot tones are provided. The algorithm and statistical behavior of the TDSC-based spectrum sensors are then explicitly analyzed. The CP method is described next. Finally, the performances of the TDSC and CP methods are evaluated via computer simulations. Four CP ratios are simulated for AWGN, Rayleigh, and Ricean channels as defined in the DVB-T Standard for a sensing time equal to 50 ms and a false alarm probability equal to 0.01. Simulation results show that the TDSC method can achieve misdetection probabilities of 0.1 and 0.01 for SNR values equal to −20.5 dB and −19.5 dB, respectively. Moreover, the TDSC method has approximately the same detection performance for different CP ratios, while the detection performance of the CP method degrades dramatically when the CP ratio becomes small. The TDSC method outperforms the CP method either by 2 dB, or 6 dB when the CP is either 1/4, or 1/32 of the discrete Fourier Transform (DFT) size, respectively.

SUMMARY OF THE INVENTION

These and other drawbacks and disadvantages of the prior art are addressed by the present principles, which are directed to a method and apparatus for spectrum sensing.

According to an aspect of the present principles, there is provided a method. The method includes a step for performing time-domain symbol cross-correlation of OFDM symbols. The cross-correlation function outputs are accumulated in another step and combined in another step, such as, but not limited to, a linear combination, using combining ratios determined through maximization of densities using a divergence function, such as a Kullback-Leibler divergence. A further step performs a likelihood test on the combined output to produce a decision statistic, which is used to determine if there is unoccupied spectrum in another step.

According to another aspect of the present principles, there is provided an apparatus. The apparatus includes a circuit for time-domain symbol cross-correlation and a circuit for accumulation of the cross-correlations. The apparatus also includes a combining circuit for combining the accumulated cross-correlations using combining ratios that are obtained by maximization of densities, for example, using Kullback-Leibler divergence. The apparatus also includes tester circuit that performs a likelihood test on the combiner output to produce a decision statistic. The apparatus also includes a circuit to determine whether there is unoccupied spectrum by using the decision statistic.

According to another aspect of the present principles, there is provided a method of performing coherent detection for spectrum sensing. The method includes a step for receiving signals comprising OFDM symbols. The method also includes steps for accumulating a number of OFDM symbols and performing a Cyclic Prefix correlation on the received signal. The method also includes steps for finding the maximum of the absolute values of the correlation functions and using the maximum value to determining the correct symbol timing of the receiving signal.

According to another aspect of the present principles, there is provided an apparatus for performing coherent detection for spectrum sensing. The apparatus includes a receiver for receiving signals comprising OFDM symbols. The apparatus also includes an accumulation circuit for accumulating a number of OFDM symbols and circuitry for performing a Cyclic Prefix correlation on the received signal. The apparatus also includes circuitry for finding the maximum of the absolute values of the correlation functions and circuitry for determining the correct symbol timing of the receiving signal from the maximum value.

These and other aspects, features and advantages of the present principles will become apparent from the following detailed description of exemplary embodiments, which is to be read in connection with the accompanying drawings.

DETAILED DESCRIPTION OF THE INVENTION

Figure 1:
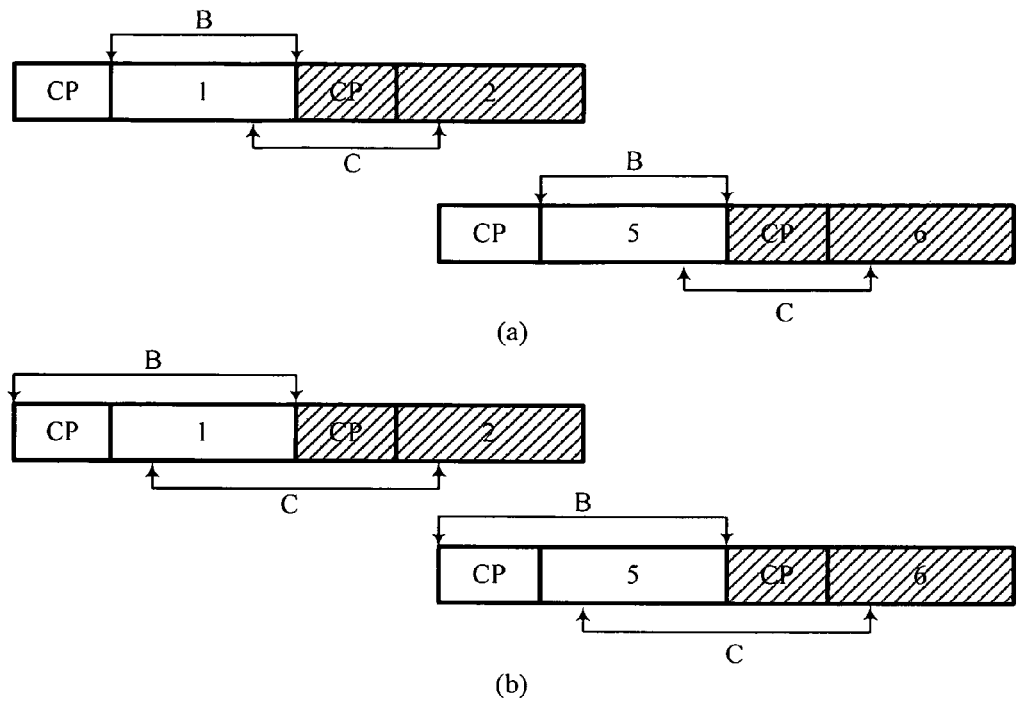
FIG. 1 shows the Time-Domain Symbol Cross-Correlation for different starting samples in the case of a single path.

A key challenge for Spectrum Sensing Cognitive Radio technology is in the development of reliable algorithms for the detection of spectrum holes. This challenge is particularly important in low Signal-to-Noise ratio environments. Simply using an energy detector is often not enough, as noise and interference from adjacent channels can be misinterpreted for occupied spectrum space. These and other difficulties are solved using the principles described herein for spectrum sensing.

TDSC Function of Two OFDM Symbols with the Same Pilot Pattern

Statistical Development

Under the assumption that L, the length of the Cyclic Prefix (CP), is longer than the length of the time-invariant channel, the $n^{th}$ sample of the $l^{th}$ OFDM symbol can be modeled as $$x_l[n] = e^{j(2\pi f_\Delta n/N + \theta_l)} \cdot \frac{1}{N} \sum_{k=0}^{N-1} H[k] X_l[k] e^{j2\pi kn/N} + w_l[n] \quad (1)$$

where $f_\Delta$ is the carrier frequency offset normalized to the subcarrier spacing. The phase $\theta_l = 2\pi f_\Delta lM/N + \theta_0$ is the initial phase of the $l^{th}$ OFDM symbol where M=N+L is the length of an OFDM symbol. The parameter N is the number of subcarriers, and $X_l[k]$ which is taken from a finite complex alphabet constellation denotes the data symbols at the $k^{th}$ subcarrier of the $l^{th}$ OFDM symbol. Moreover, H[k] is the complex channel gain of the $k^{th}$ subcarrier and $w_l[n]$ is a sample of a complex additive white Gaussian noise (AWGN) process. We will assume that $w_l[n]$ is a circularly symmetric complex Gaussian random variable which has zero-mean and a variance of $\sigma_w^2/N$. Most of the existing standards which adopt OFDM modulation allocate pilot symbols in the frequency domain, and these pilot symbols are called pilot tones. Let $P_a$, a=0, 1, ..., A−1, denote the sets of all possible pilot tone positions for the transmitted OFDM symbols. Assume that $P_{\tilde{a}}$ is the set of pilot tone positions of the $l^{th}$ OFDM symbol and $X_l[k]=P_{\tilde{a}}[k]$ for $k \in P_{\tilde{a}}$. Here, we should note that the pilot symbols $P_{\tilde{a}}[k]$ are predefined and have the same amplitude. In most cases, a pseudorandom binary sequence is used to populate the $P_{\tilde{a}}[k]$ sequence so as to reduce peak to average power ratio (PAPR). Let the $l^{th}$ and $m^{th}$ OFDM symbols be two OFDM symbols having the same pilot tone pattern, and define $$R(l, m) = \frac{1}{N} \sum_{n=0}^{N-1} x_l[n] x_m^*[n] \quad (2)$$

to be the Time-Domain Symbol Cross-Correlation (TDSC) function of two OFDM symbols. After some evaluation, it can be shown that when the signal-to-noise (SNR) ratio is low (less than −10 dB), the TDSC function, R(l,m) is comprised mainly of a constant term and a noise term.

$$R(l, m) \cong e(l-m) \cdot \frac{\rho^2}{N^2} \sum_{k \in P_{\tilde{a}}} |H[k]|^2 + \frac{1}{N} \sum_{n=0}^{N-1} w_l[n] w_m^*[n] \quad (3)$$

where the function $e(\phi) = e^{j\pi \phi M f_\Delta/N}$ represents a phase rotation caused by the carrier frequency offset. The parameter $\rho^2 = |P_{\tilde{a}}[k]|^2$ is the amplitude square of the pilot signal. For the noise term, since $w_l[n] w_m^*[n]$ are identically distributed independent random variables, according to the Central Limit Theorem (CLT), for sufficiently large N, it is a circularly symmetric complex Gaussian random variable with zero-mean and a variance of $\sigma_w^4/N^3$. The fact that the mean value of R(l,m) is not zero significantly differentiates it from noise, and we are able to exploit this property to perform spectrum sensing.

Timing Issue

We now consider a single-path channel as shown in FIG. 1(a), wherein OFDM symbols 1 and 5 have the same pilot pattern and OFDM symbols 2 and 6 have the same pilot pattern. The B cross-correlation represents TDSC function defined by Eq. (2) and its result is Eq. (3). Although the C cross-correlation is not exactly a realization of Eq. (2), samples of OFDM symbols of the same pilot pattern are correlated. Thus, the C cross-correlation result also consists of a constant term and a noise term but the constant term is slightly different. For example, in FIG. 1(a), the C cross-correlation consists of ⅕ of samples from pilot pattern 1 and ⅘ of samples from pilot pattern 2. It can be shown that the constant term is equal to $$e(l-m) \cdot \frac{\rho^2}{N^2} \left( \frac{1}{5} \sum_{k \in P_1} |H[k]|^2 + \frac{4}{5} \sum_{k \in P_2} |H[k]|^2 \right).$$

Figure 2:
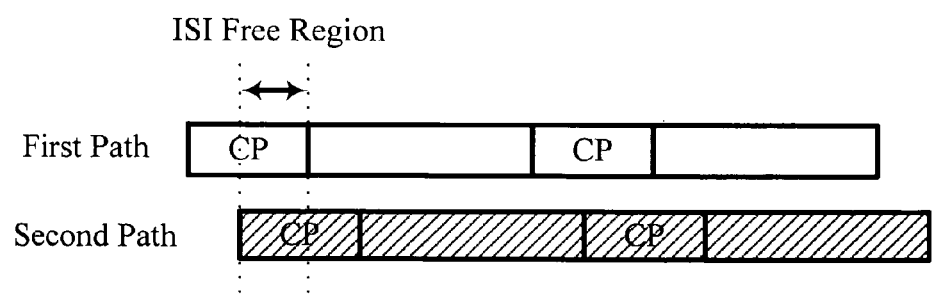
FIG. 2 shows the Orthogonal Frequency Division Multiplexing (OFDM) signal Intersymbol Interference (ISI) free region of OFDM signal in the case of a multipath channel.

Therefore, the properties of the TDSC function are independent of the initial sample time instance, and hence there is no timing information used when TDSC function is used as a basic approach to perform spectrum sensing in a single-path channel environment. Furthermore, due to the CP insertion, it is straightforward to extend the number of samples used to compute the TDSC function to improve sensing performance as shown in FIG. 1(b). The modified TDSC function is $$R(l, m) = \frac{1}{M} \sum_{n=0}^{M-1} x_l[n] x_m^*[n] \qquad (4)$$

$$\cong e(l-m) \cdot \frac{\rho^2}{N^2} \sum_{k \in P_{\tilde{a}}} |H[k]|^2 + \frac{1}{M} \sum_{n=0}^{M-1} w_l[n] w_m^*[n]$$

where M=N+L samples are taken into account. The observations above are for the case of a single-path channel. In the case of a multipath channel, (3) is valid if and only if the initial sample time instance is taken from the ISI free region as shown in FIG. 2. Assuming that the length of the ISI free region is D samples, if a search is conducted over $$\left\lceil \frac{N+L}{D} \right\rceil$$

points which are equally spaced by D−1 samples as the initial sample time instances, there will be at least one point that is in the ISI free region. The function ⌈b⌉ is the smallest integer which is larger than or equal to b. The optimum solution for TDSC based spectrum sensing algorithm is to try these $$\left\lceil \frac{N+L}{D} \right\rceil$$

points as initial sample time instances, and then take the maximum one to be the decision statistic. If the process of timing trials is not performed, and an arbitrary point is used as an initial sample time instance, there will be a performance loss due to ISI samples introduced. However, this performance loss is not significant. The maximum number of ISI samples that may be included in a TDSC function is the number of samples within the length of a multipath channel.

The OFDM system is designed so that the CP length is longer than the length of a multipath channel. Therefore, even for a CP ratio of 1/4, the number of non-ISI samples is four times more than the maximum number of ISI samples that may be included in a TDSC function defined in Eq. (4). On the other hand, the timing trials will increase complexity. For a CP ratio of 1/32, the complexity is increased by more than 32 times. Since the performance loss is not significant when timing trials are not conducted, we shall take an arbitrary initial sample time instance to perform TDSC based spectrum sensing algorithms and thereby reduce the complexity associated with the timing trials. A final note is that in a multipath channel, there are N+D non-ISI samples in an OFDM symbol. If we use M=N+L samples instead of N+D samples to compute the TDSC function, some ISI samples will be included even the initial sample time instance is the first sample of the ISI free region. However, since the parameter D is usually unknown and the performance loss is tiny, it is easier to simply use Eq. (4) to compute the TDSC functions.

TDSC Based Spectrum Sensing Algorithms

Let v=l−m be the symbol index difference of two OFDM symbols. Note that in all data transmission Standards employing OFDM technique, two OFDM symbols which have their symbol index difference equal to v have the same pilot tone positions, e.g., in the DVB-T Standard, OFDM symbols 1 and 5 have the same pilot tone positions, OFDM symbols 2 and 6 have the same pilot tone positions and so on. We now further define C(v) to be the accumulated TDSC function $$C(v) = \frac{1}{S_v} \sum_{m-l=v} R(l, m) \qquad (5)$$

$$= e(v) \frac{\rho^2}{N^2} \cdot \frac{1}{A} \sum_{a=0}^{A-1} \sum_{k \in P_a} |H[k]|^2 + \frac{1}{MS_v} \sum_{m-l=v} \sum_{n=0}^{M-1} w_l[n] w_m^*[n]$$

where $S_v$ is the number of R(l,m) terms that are accumulated and added. Here $S_v$ is selected to be an integer multiple of A. It can be seen from Eq. (5) that the mean of C(v) is unchanged no matter how many TDSC terms are accumulated. However, the variance of the noise term (second term) in C(v) is inversely proportional to $S_v$. Therefore, as long as $S_v$, the accumulated number of R(l,m), is large enough, the noise term in C(v) will be significantly reduced. Due to this property, we are able to perform spectrum sensing in very low SNR environments. Based on the accumulated TDSC function, different decision statistics can be formed. It can be shown that for a single TDSC function C(v), the optimal spectrum sensor in terms of Neyman-Pearson test is given by $$T_{NP} = |C(v)|. \qquad (6)$$

For a period of received signal, we can compute C(v) for different v. Since the noise terms ξ(μ) embedded in the accumulated TDSC functions are independent for different v's, it is expected that some performance gain can be obtained by combining various TDSC functions C(v) for different values of v. However, the C(v) corresponding to different v cannot easily be combined to perform spectrum sensing due to different phase terms e(v) in (5) caused by carrier frequency offset. An easy way is by non-coherently combining the abso lute values of C(v) for different values of v. The combination is given by $$T_{AVC} = \sum_v a_v |C(v)|. \qquad (7)$$

where $a_v$ are the combining ratios. In order to coherently combine TDSC functions C(v) for different values of v, let $$Q(v, v+d) = C(v)C^*(v+d) \qquad (8)$$
$$= e(-d)\Lambda^2 + \Lambda \cdot (\xi(v) + \xi^*(v+d)) + \xi(v)\xi^*(v+d)$$

which is the conjugate product of two accumulated TDSC functions. Then the phase term embedded in Q(v,v+d) becomes a function of d, and hence, we can combine Q(v,v+d) for different v. For example, a linear combination can be used. Therefore, let T be the linear combination of Q(v,v+d), that is $$T = \sum_v a_v Q(v, v+d) \qquad (9)$$

where $a_v$ is a combining ratio. The random variables Q(v,v+d) are uncorrelated but not necessarily independent. According to the generalized CLT, when the number of terms added in (9) is sufficiently large, T will approach a complex Gaussian distribution. However, the convergence rate is slower than that of a sum of independent random variables. If we assume that T is Gaussian distributed and the combining ratio is known, then a likelihood ratio test can be formed and the optimal decision statistic is |T|. Thus, we have $$T_{CC} = \left| \sum_v a_v Q(v, v+d) \right|. \qquad (10)$$

The problem arises as to how the $a_v$ should be chosen so as to achieve the best detection performance for a fixed probability of false alarm. Here, use of a criterion based on Kullback-Leibler divergence is used for example to determine the combining ratio. The Kullback-Leibler divergence of two densities can be thought of as the deviation between two densities. We would like the deviation between two densities for two different hypotheses as larger as possible. Thus, the combining ratios $a_v$ are chosen such the deviation in densities is maximized. Here, for example, it means that the Kullback-Leibler divergence is maximized. The Kullback-Leibler divergence between two densities f and g is defined by [11]

$$D(f \| g) = \int f \log \frac{f}{g}. \qquad (11)$$

According to the Central Limit Theorem, when the number of terms added in (10) is sufficiently large, the probability distribution of T for both hypotheses is given by $$p_T(t; H_1): CN(\mu_1, \sigma_1^2) \qquad (12)$$
$$p_T(t; H_0): CN(0, \sigma_0^2)$$

where $$\mu_1 = e(-d)\Lambda^2 \sum_v a_v \qquad (13)$$

$$\sigma_1^2 = \sum_v a_v^2 \text{Var}[Q(v, v+d)]$$

$$\sigma_0^2 = \sum_v a_v^2 \frac{\sigma_w^8}{S_v S_{v+d} M^2 N^4}$$

and $$\text{Var}[Q(v, v+d)] = \Lambda^2 \cdot \left( \frac{\sigma_w^4}{S_v M N^2} + \frac{\sigma_w^4}{S_{v+d} M N^2} \right) + \frac{\sigma_w^8}{S_v S_{v+d} M^2 N^4}. \qquad (14)$$

For two complex Gaussian random variables, the Kullback-Leibler divergence is given by $$D(H_1 \| H_0) = \ln \frac{\sigma_0^2}{\sigma_1^2} + \frac{|\mu_1 - 0|^2}{\sigma_0^2} + \frac{\sigma_1^2}{\sigma_0^2} - 1. \qquad (15)$$

Then, by computing $$\frac{\partial D(H_1 \| H_0)}{\partial a_v} = 0 \qquad (16)$$

for all v, the optimal combining ratios are obtained. Equation (16) is too complex to solve directly. We use an heuristic method to find the solution. First, let $\sigma_0^2 = \sigma_1^2$ and substitute it into (16). The solution obtained is that $$a_v = S_v S_{v+d}. \qquad (17)$$

Then, we use (17) to check (16) and find that although it is not precisely zero, it is very close to the solution. Hence, we use it as a suboptimal solution. Note that this choice of combining methodology is essentially that of maximum ratio combining (MRC), if we ignore the two cross terms in (8). The decision statistic is then given as $$T_{MRC} = \left| \sum_v S_v S_{v+d} Q(v, v+d) \right|. \qquad (18)$$

Note that although the combining methodology employed here is not exactly the maximum ratio combining, we will refer to it as MRC for convenience.

The approach of performing spectrum sensing by computing time-domain correlation function R(l;m) can be easily applied to any OFDM system employing pilot tones. However, the pilot tone patterns used in various transmission standards are different. Thus, the corresponding spectrum sensing algorithms might be slightly different. In the next section, we use the DVB-T Standard as an example and describe how to perform spectrum sensing for DVB-T OFDM systems. Based on this example, spectrum sensing algorithms for other OFDM systems which embed pilot tones can be readily developed.

Spectrum Sensing for DVB-T OFDM Systems

Every transmitted OFDM symbol contains two kinds of pilot tones. One is that of a continued pilot and the other is that of a scattered pilot. The positions of continued pilots are the same for all transmitted OFDM symbols. The scattered pilots are inserted every twelve subcarriers and their positions are shifted by three subcarriers for the next OFDM symbol so that the positions of scattered pilots are repeated every four OFDM symbols. Hence, we have that $$P_{a,scatter} = \{k | k = 12l + 3(a+1)\}$$

for l=0, 1, ... and a=0, 1, 2, 3. Therefore, there are four sets of pilot tone patterns for DVB-T OFDM. We should note that the number of scattered pilots is much larger than the number of continued pilots. For a 2K-subcarrier mode, there are 45 continued pilot tones and 141 scattered pilot tones in an OFDM symbol. Therefore, we shall compute C(v) for the case where visa multiple of four, except zero, because by doing so, the absolute mean value of C(v) is maximized. The decision statistics of two TDSC based spectrum sensing algorithms for ETSI DVB-T signals are then given by:

$$T_{NP} = |C(4)|^2$$

$$T_{MRC} = \left| \sum_{k=1}^{K} S_{4k} S_{4k+4} Q(4k, 4k+4) \right|.$$

Algorithms Based on Cyclic Prefix Property (CP Method)

Due to the CP nature of the OFDM technique, it is straightforward to use the CP to perform coherent detection for spectrum sensing. We shall define the CP correlation function as $$R_{cp}[n] = \frac{1}{SL} \sum_{u=0}^{S-1} \sum_{m=0}^{L-1} x[n+m+N+uM] x^*[n+m+uM]$$

where S is the number of OFDM symbols accumulated for the CP correlation operation and x[n] is the received signal. Although symbol timing information is lacking, the absolute value of Rcp[n] is maximum for the correct symbol timing. Thus, the decision statistic for the CP method is given by $$T_{CP} = \max_{0 \le n \le M-1} |R_{cp}[n]|.$$

The performance of the spectrum sensor for the OFDM signals employing frequency-domain pilot tones is demonstrated by computer simulation. The simulation environments considered are the AWGN, multipath Rayleigh fading, and multipath Ricean fading channels as specified in the DVB Standard. The performances with respect to misdetection probability are evaluated for a false alarm probability equal to 0.01 and with a sensing time of 50 ms. A sensing time of 50 ms corresponds to 178, 198, 210 and 216 OFDM symbols for CP ratios of 1/4, 1/8, 1/16 and 1/32. Both TDSC-based methods, the Neyman-Pearson (NP) and Maximum Ratio Combining (MRC) approaches, as well as the CP method are simulated for four different values of CP ratio as defined by the DVB European Telecommunications Standard. The sensing performances for the three different channel conditions are approximately the same. The sensing performance under the multipath channel (Rayleigh and Ricean) condition does not degrade much from the sensing performance under sing-path channel (AWGN) condition. This means that the performance loss is not significant without timing trials, we shall take an arbitrary initial sample time instance to perform TDSC based spectrum sensing algorithms and reduce the complexity due to the process of timing trials. The TDSC methods have approximately the same detection performance for different CP ratios. However, the spectrum sensing performance of the CP method degrades dramatically when the CP ratio becomes small. In all cases of CP ratio, the TDSC-MRC method has best sensing performance. The performance difference between TDSC-MRC and TDSC-NP methods is about 5 dB. Thus, although the TDSC-MRC method has larger complexity, it provides 5 dB performance gain. The simulations show that the TDSC-MRC method can achieve a misdetection probability of 0.1 when the SNR equals −20.5 dB for the four CP ratios. The TDSC-MRC method outperforms the CP method by 2 dB and 7 dB when the CP ratio is 1/4 and 1/32, respectively. Results also reveal that the simulated performance is very close to the theoretical value for TDSC methods under a single-path channel condition. This indicates that the theoretical values of TDSC methods under a single-path channel condition can be used as a good indicator of the performance realized by the spectrum sensing algorithm.

OFDM spectrum sensors that exploit the existence of frequency-domain pilot tones have been described. The proposed TDSC methods require that only correlations be computed to perform spectrum sensing. Hence, the spectrum sensing algorithms described have very low complexity and are easy to apply in practice. The simulation results show that the proposed spectrum sensor has excellent performance. The proposed spectrum sensor using the TDSC-MRC method can achieve misdetection probabilities of 0.1 and 0.01 with respect to a false alarm rate of 0.01 for a sensing time of 50 ms even when the values of SNR are as low as −20.5 dB and −19.5 dB. When the TDSC-MRC method is compared to the CP method, the TDSC-MRC method outperforms the CP method for all of the four CP ratios considered. The simulation results also show that the misdetection probability obtained by simulation is very close to the theoretical value for TDSC methods under single-path channel condition derived in this paper. Thus, the theoretical value for misdetection probability given herein provides an accurate indication of spectrum sensor performance. Finally, and most importantly, it has been shown that a simple and accurate spectrum sensing algorithm for OFDM signals is realizable and can be easily applied in many practical systems.

Figure 3:
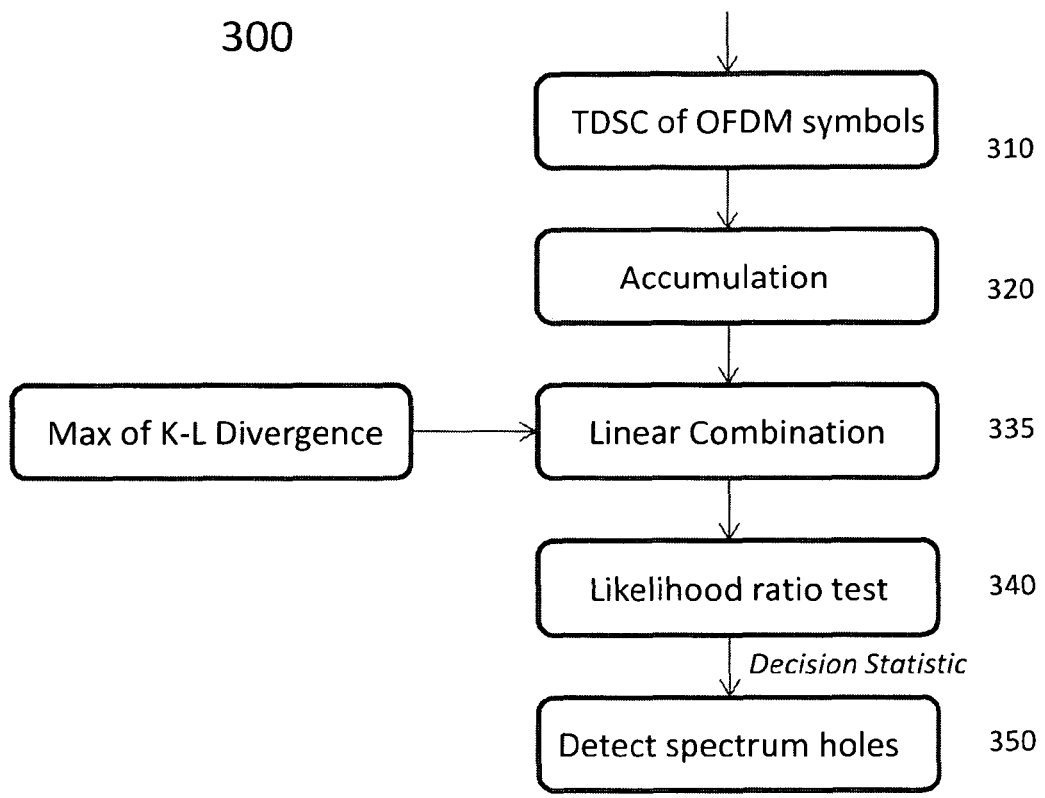
FIG. 3 shows one embodiment of a method for spectrum sensing using time-domain symbol cross-correlation of OFDM symbols.

One embodiment of the present principles is illustrated by the flow diagram in FIG. 3. A method of spectrum sensing is shown as 300. The time-domain symbol cross-correlation of OFDM symbols is performed in step 310. An accumulation of TDSC functions is performed in step 320. The divergence between densities is maximized in step 330, for example using Kullback-Leibler divergence, to produce optimal combining ratios and, in step 335, a combination of the accumulated TDSC functions is produced using the optimal combining ratios. In step 340, a likelihood ratio test is performed to produce a decision statistic. The decision statistic is used in step 350 to determine if there is unoccupied spectrum space.

Figure 4:
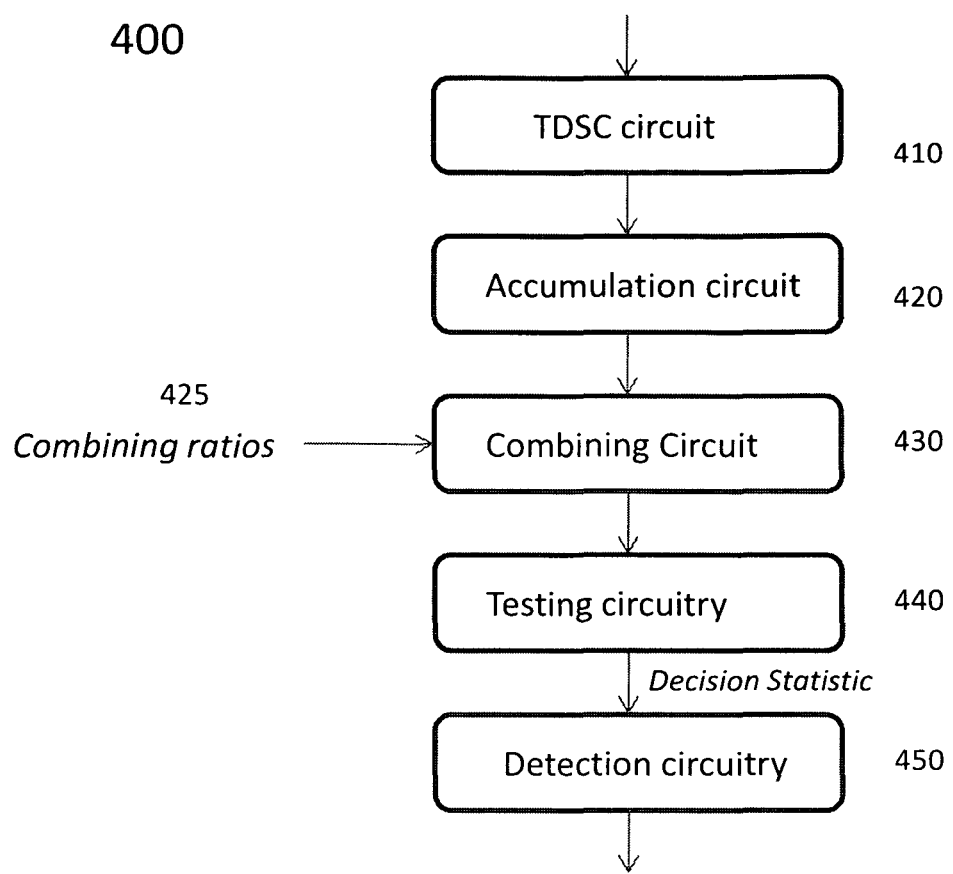
FIG. 4 shows one embodiment of an apparatus for spectrum sensing using time-domain symbol cross-correlation of OFDM symbols.

One embodiment of an apparatus to carry out the principles of the present invention is shown in FIG. 4 by apparatus 400. Correlator 410 performs time-domain symbol cross-correlation of input OFDM symbols and sends output to accumulator circuit 420. Accumulator circuit 420 accumulates the TDSC functions and from correlator 410 and sends the result to combining circuit 430, which also receives as input combining ratios 425. Combiner 430 combines the accumulated TDSC function results using the combining ratios 425, perhaps through linear combination. Tester circuit 440 performs a likelihood ratio test to produce a decision statistic as output to spectrum detector 450. Spectrum detector 450 determines from the decision statistic if there is unoccupied spectrum space.

Figure 5:
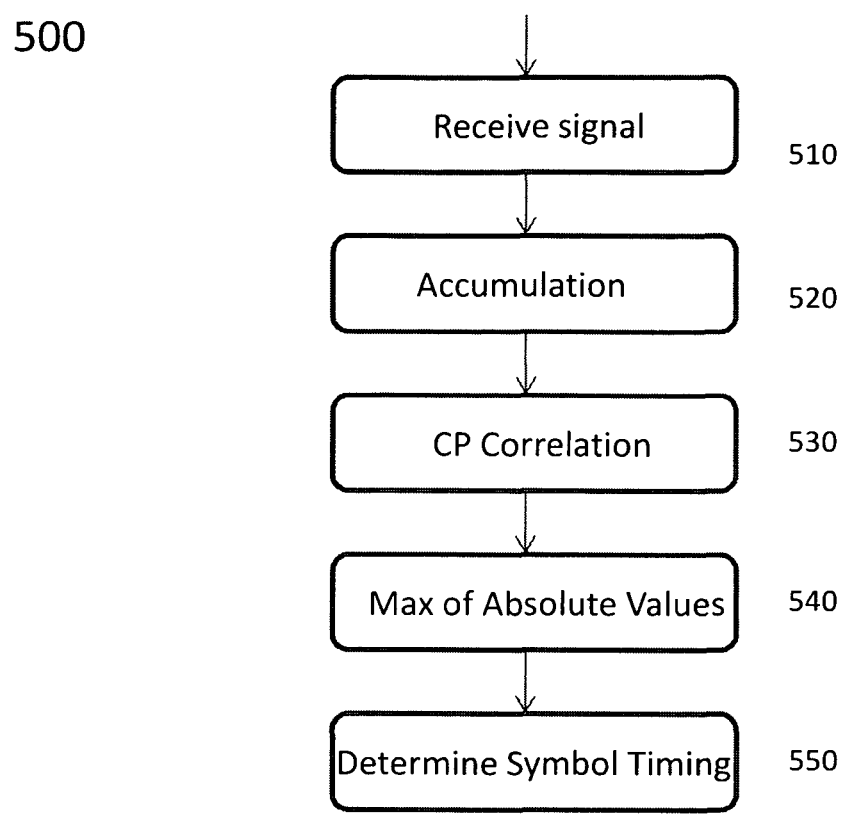
FIG. 5 shows one embodiment of a method for performing coherent detection for spectrum sensing.

Another additional embodiment of the present principles is illustrated in FIG. 5 by a method 500 for performing coherent detection for spectrum sensing. Signals are received in step 510 and the OFDM symbols included in that signal are accumulated in step 520. A cyclic prefix correlation function is performed on the accumulated symbols in step 530, followed by finding the maximum value of the absolute value of those functions for various symbol timings in step 540. The maximum value is used to determine the correct symbol timing for the received signal in step 550.

Figure 6:
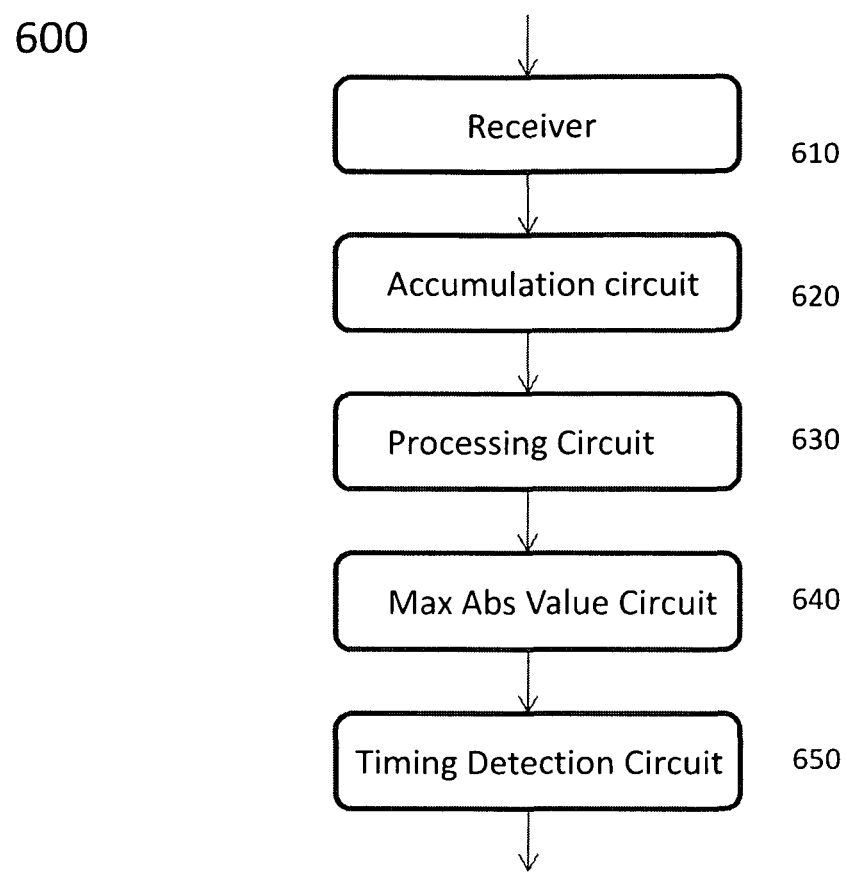
FIG. 6 shows one embodiment of an apparatus for performing coherent detection for spectrum sensing.

A further additional embodiment of the present principles is illustrated in FIG. 6 by an apparatus for performing coherent detection for spectrum sensing. Signals are received by receiver 410 and the OFDM symbols included in that signal are accumulated by accumulator 620. A cyclic prefix correlation function is performed on the accumulated symbols by processing circuitry 630, followed by finding the maximum value of the absolute value of those functions for various symbol timings by circuit 640. The maximum value is used to determine the correct symbol timing for the received signal by circuitry 650.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method of spectrum sensing, comprising:
combining conjugate products of accumulated time-domain symbol cross-correlations of Orthogonal Frequency Division Multiplexed (OFDM) symbols with combining ratios, wherein the combining ratios are approximated using products of numbers of accumulated cross correlation terms;
performing a likelihood ratio test on said combined conjugate products to determine a decision statistic; and
using said decision statistic value to detect unoccupied spectrum space.

2. The method of claim 1, wherein a Kullback-Leibler density divergence function is used to further approximate the combining ratios.

3. The method of claim 1, wherein said combining step uses a linear combination of conjugate products of accumulated time-domain symbol cross-correlations of OFDM symbols.

4. The method of claim 1, wherein the cross-correlation is performed on signals whose pilots are repeated every four OFDM symbols.

* * * * *